United States Patent [19]
Sullivan

[11] Patent Number: 5,902,855
[45] Date of Patent: May 11, 1999

[54] GOLF BALL WITH IONOMERIC COVER AND METHOD OF MAKING SAME

[75] Inventor: Michael J. Sullivan, Chicopee, Mass.

[73] Assignee: Lisco, Inc.

[21] Appl. No.: 08/944,342

[22] Filed: Oct. 6, 1997

Related U.S. Application Data

[63] Continuation of application No. 08/591,046, Jan. 25, 1996, abandoned.

[51] Int. Cl.$^6$ .................................................. A63B 37/12
[52] U.S. Cl. ........................ 525/221; 525/196; 525/201; 525/330.2; 473/378; 473/385
[58] Field of Search .................................... 525/196, 201, 525/221, 330.2; 473/378, 385

[56] References Cited

U.S. PATENT DOCUMENTS

| | | |
|---|---|---|
| 4,272,079 | 6/1981 | Nakade et al. . |
| 4,431,193 | 2/1984 | Nesbitt . |
| 4,679,795 | 7/1987 | Melvin et al. . |
| 4,690,981 | 9/1987 | Statz . |
| 4,798,386 | 1/1989 | Berard . |
| 4,884,814 | 12/1989 | Sullivan . |
| 4,911,451 | 3/1990 | Sullivan et al. . |
| 5,098,105 | 3/1992 | Sullivan . |
| 5,120,791 | 6/1992 | Sullivan . |
| 5,156,405 | 10/1992 | Kitaoh et al. . |
| 5,222,739 | 6/1993 | Horiuchi et al. . |
| 5,244,969 | 9/1993 | Yamada . |
| 5,274,041 | 12/1993 | Yamada . |
| 5,281,651 | 1/1994 | Arjunan et al. . |
| 5,306,760 | 4/1994 | Sullivan . |
| 5,312,857 | 5/1994 | Sullivan . |
| 5,314,187 | 5/1994 | Proudfit . |
| 5,324,783 | 6/1994 | Sullivan . |
| 5,328,959 | 7/1994 | Sullivan . |
| 5,338,610 | 8/1994 | Sullivan . |
| 5,397,840 | 3/1995 | Sullivan et al. . |
| 5,516,847 | 5/1996 | Sullivan et al. . |
| 5,605,968 | 2/1997 | Egashira .................................. 525/221 |
| 5,691,418 | 11/1997 | Hagman .................................. 525/196 |
| 5,714,546 | 2/1998 | Egashira .................................. 525/196 |

FOREIGN PATENT DOCUMENTS

| | | |
|---|---|---|
| 2264302 | 8/1993 | United Kingdom . |
| 2276628 | 5/1994 | United Kingdom . |
| 2286400 | 8/1995 | United Kingdom . |
| 00212 | 1/1995 | WIPO . |

OTHER PUBLICATIONS

Research Disclosure No. 27103–Dupont–Nov. 1986.
Du Pont NUCREL® 035 Resin—Technical Information, Du Pont Company, Polymer Products Dept., Wilmington, DE 19898.
ESCOR® Acid Terpolymers, EXXON Chemical.

*Primary Examiner*—David Buttner

[57] ABSTRACT

Disclosed herein is a golf ball having a scuff-resistant, soft cover formed from more than 90 wt. % of one or more acrylate ester-containing ionomeric resins. The acrylate ester-containing ionomeric resins preferably are terpolymers. The golf ball has good durability and a high spin rate. A method of making the golf ball also is disclosed.

37 Claims, No Drawings

GOLF BALL WITH IONOMERIC COVER AND METHOD OF MAKING SAME

This application is a continuation of application Ser. No. 08/591,046 filed on Jan. 25, 1996 now abandoned.

BACKGROUND OF THE INVENTION

The present invention relates to golf balls having ionomeric covers, and more particularly to golf balls having covers formed from acrylate ester-containing ionic copolymers.

Ionomeric resins are polymers containing interchain ionic bonding. As a result of their toughness, durability, and flight characteristics, various ionomeric resins sold by E.I. DuPont deNemours & Company under the trademark "Surlyn®" and by the Exxon Corporation (see U.S. Pat. No. 4,911,451) under the trademark "Escor®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability necessary for repetitive play.

Ionomeric resins are ionic copolymers of an olefin such as ethylene and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, i.e. improved durability, etc., for golf ball cover construction over balata. However, the advantages gained in increased durability have been offset to some degree by the decreases produced in playability. This is because the durable ionomeric resins tend to be very hard when utilized for golf ball cover construction, and thus lack the degree of softness required to impart the spin necessary to control the ball in flight.

As a result, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups) and additive ingredients such as reinforcements, etc., a great deal of research continues in order to develop golf ball cover compositions exhibiting not only the improved impact resistance and carrying distance properties produced by the "hard" ionomeric resins, but also the playability (i.e. "spin") characteristics previously associated with the "soft" balata covers, properties which are still desired by the more skilled golfer.

In various attempts to produce a durable, high spin ionomeric golf ball, the golfing industry has blended the hard ionomeric resins with a number of softer ionomeric resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid, and an acrylate ester. It has been found that golf ball covers formed from hard-soft ionomer blends tend to become scuffed more readily than covers made of hard ionomer alone. It would be useful to develop a golf ball having a combination of softness and durability which is better than the softness-durability combination of a golf ball cover made from a hard-soft ionomer blend.

SUMMARY OF THE INVENTION

An object of the invention is to provide a golf ball with a soft cover which has good scuff resistance.

Yet another object of the invention is to provide a golf ball having a favorable combination of spin rate and durability.

A further object of the invention is to provide a golf ball having a soft cover made from a cover material which is blended with minimal mixing difficulties.

Another object of the invention is to provide a method of making a golf ball which has a soft cover with good scuff resistance and cut resistance.

Yet another object of the invention is to provide a method of making a durable golf ball with a relatively high spin rate.

Other objects will be in part obvious and in part pointed out more in detail hereafter.

The invention in a preferred form is a golf ball comprising a core and a scuff-resistant cover. The cover comprises an ionomeric resin having more than 90 weight % of one or more acrylate ester-containing ionic copolymers. The one or more acrylate ester-containing ionic copolymers are each formed from (a) an olefin having 2 to 8 carbon atoms, (b) an unsaturated monomer of the acrylate ester class having from 1 to 21 carbon atoms, and (c) an acid which includes at least one member selected from the group consisting of α, β-ethylenically unsaturated mono- or dicarboxylic acids with a portion of the acid groups being neutralized with cations. The one or more acrylate ester-containing ionic copolymers have an overall Shore D hardness of 40–64. The resulting golf ball has a coefficient of restitution of at least 0.770.

The one or more acrylate ester-containing ionic copolymers preferably are terpolymers. In each copolymer, the olefin preferably is an alpha olefin, and the acid preferably is acrylic acid. The overall cover preferably has a Shore D hardness of no more than about 64 and more preferably about 40–64.

The one or more acrylate ester-containing ionic copolymers typically have a degree of neutralization of the acid groups in the range of about 10–100%. In a preferred form of the invention, the covers have a scuff resistance rating of 3.0 or better when subjected to the Golf Ball Cover Scuff Test which is described below.

In a particularly preferred form of the invention, the cover comprises an ionomeric resin having at least 95 weight % of one or more acrylate ester-containing ionic copolymers. The cover preferably contains at least 90 weight % ionomeric resin. Each of the acrylate ester-containing copolymers preferably comprises ethylene, at least one acid selected from the group consisting of acrylic acid, maleic acid, fumaric acid, itaconic acid, methacrylic acid, and half-esters of maleic, fumaric and itaconic acids, and at least one comonomer selected from the group consisting of methyl, ethyl, n-propyl, n-butyl, n-octyl, 2-ethylhexyl, and 2-methoxyethyl-1-acrylates.

Another preferred form of the invention is a method of making a golf ball. The method comprises the steps of obtaining a golf ball core and forming a scuff-resistant cover over the core. The cover comprises an ionomeric resin having more than 90 weight % of one or more acrylate ester-containing ionic copolymers formed from (a) an olefin having 2 to 8 carbon atoms, (b) an unsaturated monomer of the acrylate ester class having from 1 to 21 carbon atoms, and (c) an acid which is selected from the group consisting of alpha, beta-ethylenically unsaturated mono- or dicarboxylic acids with a portion of the acid groups being neutralized with cations. The one or more acrylate ester-containing ionic copolymers preferably have a Shore D hardness of about 40–64.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The present invention overcomes mixing difficulties associated with the preparation of soft-covered ionomeric golf balls by forming the cover of soft ionomeric golf balls from a cover composition in which the ionomer has more than 90 weight % of an acrylate ester-containing ionic copolymer or blend of acrylate ester-containing ionic copolymers. Furthermore, the invention provides golf ball covers having a favorable combination of durability and spin rate.

The one or more acrylate ester-containing ionic copolymers to be used in forming the cover of the inventive golf ball each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as non-limiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, α-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%.

The one or more acrylate ester-containing ionic copolymers each has an individual Shore D hardness of about 5–64. The overall Shore D hardness of the acrylate ester-containing ionic copolymer or blend of acrylate ester-containing ionic copolymers is 40–64. It is preferred that the overall Shore D hardness of the acrylate ester-containing ionic copolymer or blend is in the range of 50–64 in order to impart particularly good playability characteristics to the ball. It has been found that excellent results can be obtained when the Shore D hardness of the acrylate ester-containing ionic copolymer or acrylate ester-containing ionic copolymer blend is in the range of 52–54 for a soft covered golf ball or 62–64 for a somewhat harder ball.

The cover of the invention is formed over a core to result in a golf ball having a coefficient of restitution of at least 0.770, more preferably at least 0.780, and most preferably at least 0.790. The coefficient of restitution of the ball will depend upon the properties of both the core and the cover.

The cover of the present invention is adapted for use with any type of golf ball core.

The acrylate ester-containing ionic copolymer or copolymers used in the golf ball of the invention can be obtained by neutralizing commercially available acrylate ester-containing acid copolymers such as polyethylene-methyl acrylate-acrylic acid terpolymers, including ESCOR ATX (Exxon Chemical Company) or poly (ethylene-butyl acrylate-methacrylic acid) terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material. The properties of non-limiting examples of commercially available unneutralized acid terpolymers which can be used to form the golf ball covers of the invention are provided below in Table 1.

TABLE 1

| Trade Name | Melt Index dg/min ASTM D1238 | Acid No. % KOH/g | Flex modulus MPA (ASTM D790) | Hardness (Shore D) |
|---|---|---|---|---|
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel 010 | 11 | 60 | 40 | 40 |
| Nucrel 035 | 35 | 60 | 59 | 40 |

The ionomer resins used to form the golf balls of the invention are produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball having a surprisingly good scuff resistance for a given cover hardness. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the cover has a scuff resistance of no more than about 2.0. The scuff resistance test is described in detail below.

The golf ball of the invention has a spin rate of 7,500 or more.

It is particularly preferred that the golf ball of the invention have a spin rate of 8,000 or more in order to provide experienced players with excellent spin characteristics. In a particularly preferred form of the invention, the golf ball has a spin rate of at least 8,500. These spin rates are surprisingly high given the good scuff and cut resistance ratings of the ionomeric cover material. The test for spin rate is described below.

Additional materials may also be added to the ionic cover compositions of the present invention as long as they do not substantially reduce the playability properties of the ball. Such materials include dyes (for example, Ultramarine Blue sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired. Furthermore, nonionomeric cover materials such as e.g., metallocene catalyzed polyolefins, including EXACT materials available from EXXON, can be blended with the terpolymers as long as a favorable combination of scuff resistance, COR, compression and spin rate is obtained.

When a blend of two or more acrylate ester-containing ionic copolymers is to be used, the cover compositions of the present invention may be produced according to conventional melt blending procedures. Generally, the copolymer resins are blended in a Banbury type mixer, two-roll mill, or extruder prior to neutralization. After blending, neutralization then occurs in the melt or molten state in the Banbury mixer. Mixing problems are minimal because preferably more than 91 wt %, and more preferably at least 95 wt % of the ionic copolymers in the mixture contain acrylate esters, and in this respect, most of the polymer chains in the mixture are similar to each other. The blended composition is then formed into slabs, pellets, etc., and maintained in such a state until molding is desired. If necessary, further additives such as inorganic fillers, antioxidants, stabilizers, processing aids, etc., may be added and uniformly mixed before initiation of the molding process. In one embodiment of the invention, a masterbatch of non-acrylate ester-containing ionomer with pigments and other additives incorporated therein is mixed with the acrylate ester-containing copolymers in a ratio of about 1–7 weight % masterbatch and 93–99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around a wound or solid molded core to produce a golf ball having a diameter of about 1.680–1.80 inches and typically but not necessarily weighing about 1.620 ounces. The standards for both the minimum diameter and maximum weight of the balls are established by the United States Golf Association (U.S.G.A.).

The cores of the inventive golf balls typically have a coefficient of restitution of about 0.775 and a PGA compression of about 110. The term "solid cores" as used herein refers not only to one piece cores but also to those cores having a separate solid layer beneath the cover and over the core. When the golf ball of the invention has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein.

As indicated, the golf balls of the present invention may be produced by forming covers consisting of the above-described compositions around cores by molding processes. For example, in compression molding, the cover composition is formed via injection at e.g. about 380° F. to about 450° F. into smooth surfaced hemispherical shells which are then positioned around the core in a dimpled golf ball mold and subjected to compression molding at e.g. 200–300° F. for 2–10 minutes, followed by cooling at 50–70° F. for 2–10 minutes, to fuse the shells together to form an unitary ball. In one type of injection molding process, the cover composition is injected directly around the core placed in the center of a golf ball mold for a period of time at a mold temperature of from 50 to about 100° F. After molding, the golf balls produced may undergo various further processing steps such as buffing, painting, and marking.

Having generally described the invention, the following examples are included for purposes of illustration so that the invention may be more readily understood and are in no way intended to limit the scope of the invention unless otherwise specifically indicated.

EXAMPLE 1

A set of golf balls was made with solid cores and a cover composition of 75 weight % NUCREL 035, which is an acrylate ester-containing acid terpolymer, and 25 weight % of a masterbatch containing 4.5 weight % MgO in Surlyn® 1605 ("MgO Masterbatch").

The terpolymer was reacted with the masterbatch at a temperature of about 250° F. under high shear conditions at a pressure of about 0 to 100 psi. The magnesium in the masterbatch neutralized acid groups of the terpolymer at a level of about 62% neutralization. The molded balls were finished with polyurethane primer and top coats. The PGA compression, coefficient of restitution, Shore C hardness, scuff resistance, spin rate and cold crack of the golf balls were determined. The results are shown on Table 2 below.

To measure cold crack, the finished golf balls were stored at −10° F. for at least 24 hours and were then subjected to 5 blows in a coefficient machine at 165 ft/sec. The balls were allowed to return to room temperature and were then visually inspected for cover cracking. None of the golf balls experienced cracking.

Coefficient of restitution (COR) was measured by firing the resulting golf ball in an air cannon at a velocity of 125 feet per second against a steel plate which was positioned 12 feet from the muzzle of the cannon. The rebound velocity was then measured. The rebound velocity was divided by the forward velocity to give the coefficient of restitution. Shore hardness was determined in general accordance with ASTM Test 2240, but was measured on the golf ball.

Comparative Example 1

A set of 12 golf balls was made according to the same procedure as that of Example 1 with the exception that NUCREL 925, a non-acrylate ester-containing acid copolymer was substituted for NUCREL 035. The resulting golf ball cover was too hard, resulting in four breaks during cold crack testing.

Comparative Example 2

The procedure of Example 1 was repeated with the exception that the MgO Masterbatch was replaced by pure Surlyn® 1605. All of the golf ball covers broke during cold crack testing.

Comparative Example 3

The procedure of Comparative Example 1 was repeated with the exception that the MgO masterbatch was replaced by pure Surlyn® 1605. The results are shown on Table 2. When subjected to cold crack testing, all of the golf ball covers broke.

As can be seen from the results of Example 1 and Comparative Examples 1–3, inferior golf balls are obtained when a hard, non-acrylate ester-containing copolymer is used instead of a softer, acrylate ester-containing terpolymer, and when either an acrylate ester-containing acid terpolymer or a non-acrylate ester-containing acid copolymer is not neutralized with metal ions.

EXAMPLE 2

An acrylate ester-containing terpolymer sold as ESCOR ATX 325 (Exxon Chemical Co.) was 57% neutralized with lithium cations. The ionomeric material, which also contained titanium dioxide, brightener, etc. from a white masterbatch, was placed over a solid golf ball core and the golf ball was primed and top coated. The properties of the resulting golf ball are shown on Table 3. This procedure was repeated using different combinations of terpolymers with cations and cation blends at the degrees of neutralization which are shown on Table 3. In the cation blends, mole ratios were about 1:1:1. All of the ATX materials shown on Table 2 are ESCOR ATX materials available from Exxon Chemical Co. The Nucrel materials are available from DuPont Chemical Co. Primacor 3440 is available from Dow Chemical Co.

The spin rate of the golf ball was measured by striking the resulting golf balls with a pitching wedge or 9-iron wherein the club-head speed is about 80 feet per second and the ball was launched at an angle of 26 to 34 degrees with an initial velocity of 100–115 feet per second. The spin rate was measured by observing the rotation of the ball in flight using stop action Strobe photography or via the use of a high speed video system.

The scuff resistance test was conducted in the following manner: a Top-Flite tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a club head speed of 125 feet per second. A minimum of three samples of each ball were tested. Each ball was hit three times. After testing, the balls were rated according to the following table:

| Rating | Type of damaqe |
| --- | --- |
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

The balls that were tested were primed and top coated.

As shown on Table 3, many of the cover materials resulted in golf balls having a scuff resistance of 1.5 or less, and others had a scuff resistance rating of 1.5–2.5.

Comparative Example 4

A golf ball with a cover formed from a blend of a commercially available hard sodium ionomer and a commercially available soft acrylate ester-containing zinc ionomer in which the blend contains less than 60 wt % soft ionomer was subjected to the same testing as the golf balls of Example 2. The results are shown on Table 3.

EXAMPLE 3

The procedure of Example 2 was repeated with the exception that single cations of lithium, magnesium, sodium and potassium were used in the cover material. The results are shown on Table 4.

As indicated on Table 4, the scuff resistance of the golf balls was 3.0 or better. The scuff resistance of the balls with covers made of an acrylic acid terpolymer was 1.0. For a given terpolymer, the scuff resistance did not change when different cations were used for neutralization.

As will be apparent to persons skilled in the art, various modifications and adaptations of the structure above described will become readily apparent without departure from the spirit and scope of the invention, the scope of which is defined in the appended claims.

TABLE 2

| Experiment No. | Cover Material | Weight | PGA Comp. | COR (×1000) | Shore C Hardness | Cold Crack |
|---|---|---|---|---|---|---|
| 1-1 | 75% Nucrel 035/ 25% MgO MB in Surlyn 1605 | 45.2 | 104 | .783 | 80 | No breaks |
| comp. 1 | 75% Nucrel 925/ 25% MgO MB in Surlyn 1605 | 45.1 | 111 | .798 | 90 | 4 breaks |
| comp. 2 | 75% Nucrel 035/ 25% Surlyn 1605 | 45.1 | 99 | .774 | 70 | All broke |
| comp. 3 | 75% Nucrel 925/ 25% Surlyn 1605 | 45.2 | 106 | .790 | 75 | All broke |

TABLE 3

| Experiment No. | Cover Material | Cation | % Neutralization | PGA Comp. | COR (×1000) | Shore D Hardness | Scuff Resist. | Spin Rate (#9 Iron at 105 ft/sec) |
|---|---|---|---|---|---|---|---|---|
| Comp. 4 | hard-soft ionomer blend 1 (control) | Zn/Na | 60% | 90 | 787 | 58 | 4.0 | 9.859 |
| 2-1 | ATX 325 | Li | 57% | 86 | 787 | 51 | 1.0 | 10.430 |
| 2-2 | ATX 325 | Li/Zn/K | 65% | 86 | 787 | 50 | 1.0 | 10.464 |
| 2-3 | ATX 320 | Li | 57% | N.T. | N.T. | 56 | 1.0 | 10.299 |
| 2-4 | ATX 320 | Li/Zn/K | 65% | 87 | 790 | 55 | 1.5 | 10.355 |
| 2-5 | Nucrel 010 | Li | — | 89 | 803 | 65 | 3.0 | 7.644 |
| 2-6 | Nucrel 010 | Li/Zn/K | — | 89 | 802 | 65 | 4.0 | 7.710 |
| 2-7 | Nucrel 035 | Li | — | 87 | 801 | 62 | 3.0 | 8.931 |
| 2-8 | Nucrel 035 | Li/Zn/K | — | 87 | 798 | 62 | 3.0 | 8.915 |
| 2-9 | ATX 310 | Li | 53% | 88 | 802 | 62 | 2.5 | 8.892 |
| 2-10 | ATX 310 | Li/Zn/K | 60% | 88 | 801 | 63 | 2.5 | 8.244 |
| 2-11 | ATX 325 | Li | 57% | 83 | 797 | 55 | 1.5 | — |
| 2-12 | ATX 325 | Li/Zn/K | 65% | 82 | 796 | 53 | 1.5 | |
| 2-13 | 50% ATX 325-Li 50% ATX 320-unneut. | (Li) | 28.5% | 89 | 777 | 50 | 1.5 | — |
| 2-14 | 75% ATX320 —Li/Zn/K 25% ATX320 -unneut. | (Li/Zn/K) | 49% | 87 | 776 | 54 | 1.5 | — |
| 2-15 | 60% ATX325 —Li/Zn/K 40% Primacor 3440-unneut. | (Li/Zn/K) | 39% | 88 | 779 | 54 | 1.5 | — |
| 2-16 | ATX 320 | Unneut. | — | 88 | 775 | 45 | 2.0 | — |
| 2-17 | ATX 325 | Unneut. | — | 88 | — | 42 | 1.5 | — |
| 2-18 | ATX 325 | Li | 50% | 95 | 795 | 50 | 1.0 | — |
| 2-19 | ATX 325 | Li | 30% | 96 | 791 | 46 | 1.5 | — |
| 2-20 | ATX 325 | Li/Zn/K | 50% | 91 | 791 | 48 | 1.0 | — |
| 2-21 | ATX 325 | Li/Zn/K | 30% | 90 | N.T. | 45 | 1.0 | — |
| 2-22 | ATX 325 | Li/Zn/K | 50% | 91 | N.T. | 47 | 1.0 | — |

TABLE 4

| Experiment No. | Cover Material | Cation | % Neutralization | PGA Comp. | COR (×1000) | Shore D Hardness | Scuff Resistance |
|---|---|---|---|---|---|---|---|
| 3-1 | Nucrel 035 | Li | 100 | 90 | 792 | 62 | 3.0 |
| 3-2 | Nucrel 035 | Mg | 100 | 89 | 792 | 62 | 3.0 |
| 3-3 | ATX 325 | Li | 100 | 86 | 790 | 51 | 1.0 |
| 3-4 | ATX 325 | Mg | 100 | 85 | 791 | 51 | 1.0 |
| 3-5 | ATX 325 | Na | 81 | 85 | 790 | 51 | 1.0 |
| 3-6 | ATX 325 | K | 95 | 85 | 791 | 51 | 1.0 |

What is claimed is:

1. A golf ball having a core and a cover, the cover comprising an ionomeric resin in which the ionomeric resin contains at least 95 wt % of one or more copolymers formed from (a) ethylene, (b) methyl acrylate, and (c) acrylic acid, said one or more copolymers being based upon one or more unneutralized copolymers with a mass average acid number of about 45 or less, the cover having a Shore D hardness of about 40–64, the golf ball having a coefficient of restitution of at least 0.770 and a scuff resistance rating of no higher than 2.5.

2. A golf ball according to claim 1, wherein said one or more copolymers comprise a blend of at least two different terpolymers.

3. A golf ball according to claim 1, wherein the golf ball has a spin rate of at least about 7,500 revolutions per minute when struck with a 9-iron at a clubhead speed of about 80 feet per second and a launch angle of 26 to 34 degrees.

4. A golf ball according to claim 1, wherein the cover contains at least 90 wt % ionomer resin.

5. A golf ball according to claim 4, wherein said one or more copolymers comprises a blend of at least two terpolymers.

6. A golf ball according to claim 1, wherein the neutralized portion of said one or more copolymers is neutralized with one or more cations selected from the group consisting of zinc, sodium, magnesium, lithium, potassium, calcium, manganese, nickel, aluminum, tin and chromium.

7. A golf ball according to claim 1, wherein the ionomeric resin has a neutralization level of 50–100%.

8. A golf ball according to claim 1, wherein the cover has a Shore D hardness of about 52–54.

9. A golf ball according to claim 1, wherein the cover has a Shore D hardness of about 62–64.

10. A golf ball according to claim 1, wherein said one or more copolymers are based upon one or more unneutralized copolymers with a mass average acid number of about 45.

11. A golf ball according to claim 1, wherein the ball has a scuff resistance rating of no higher than 2.0.

12. A golf ball according to claim 1, wherein the ball has a scuff resistance rating of no higher than 1.5.

13. A method of making a golf ball having a core and a cover, comprising the steps of:

obtaining a golf ball core, forming a scuff-resistant cover over the core, the cover being formed from at least 99 wt % of one or more copolymers which are formed from (a) ethylene, (b) methyl acrylate, and (c) acrylic acid, said one or more copolymers being based upon one or more unneutralized copolymers with a mass average acid number of about 45 or less, the cover having a Shore D hardness of about 40–64, the golf ball having a coefficient of restitution of at least 0.770 and a scuff resistance rating of no higher than 2.5.

14. A method according to claim 13, wherein the core and cover are formed to impart to the golf ball a spin rate of at least about 7,500 revolutions per minute when struck with a 9-iron at a clubhead speed of about 80 feet per second and a launch angle of 26 to 34 degrees.

15. A golf ball comprising a core and a cover consisting essentially of an ionomeric resin in which the ionomeric resin contains at least 95 wt % of one or more terpolymers which are formed from ethylene, acrylic acid, and methyl acrylate, the cover having a Shore D hardness of about 40–64, said one or more terpolymers being based upon one or more unneutralized terpolymers with a mass average acid number of about 45 or less.

16. A golf ball according to claim 15, wherein the golf ball has scuff resistance rating of no higher than 2.5.

17. A golf ball according to claim 15, wherein the golf ball has a spin rate of at least 7,500 revolutions per minute when struck with a 9-iron at a clubhead speed of about 80 feet per second and a launch angle of 26 to 34 degrees.

18. A golf ball according to claim 15, wherein said one or more terpolymers comprise a blend of at least two terpolymers.

19. A method of making a golf ball having a core and a cover, comprising the steps of:

obtaining a golf ball core, forming a cover over the core, the cover consisting essentially of an ionomeric resin in which the ionomeric resin contains at least 95 wt % of one or more terpolymers of ethylene, methyl acrylate, and acrylic acid, the acrylic acid being neutralized with cations, said one or more terpolymers being based upon one or more unneutralized terpolymers with a mass average acid number of about 45 or less, the cover having a Shore D hardness of 40–64.

20. A golf ball having a core and a scuff-resistant cover, the cover consisting essentially of an ionomeric resin in which the ionomeric resin contains at least 95 wt % of one or more copolymers formed from (a) ethylene, (b) methyl acrylate, and (c) acrylic acid with a portion of the acrylic acid being neutralized with cations, the cover having a Shore D hardness of 40–64, said one or more copolymers being based upon one or more unneutralized copolymers with a mass average acid number of about 45 or less.

21. A golf ball according to claim 20, wherein the golf ball has a scuff resistance rating of no higher than 2.5.

22. A golf ball according to claim 20, wherein the ionomeric resin contains at least 99 wt % of said one or more copolymers.

23. A golf ball according to claim 20, wherein said one or more copolymers comprise a blend of at least two terpolymers.

24. A golf ball according to claim 20, wherein the cover contains at least 90 wt % ionomer resin.

25. A golf ball according to claim 20, wherein the ionomeric resin has a neutralization level of 5014 100%.

26. A golf ball according to claim 20, wherein said cover has a Shore D hardness of about 52–54.

27. A golf ball according to claim 20, wherein said cover has a Shore D hardness of about 62–64.

28. A golf ball according to claim 20, wherein said one or more copolymers are based upon one or more unneutralized copolymers with a mass average acid number of about 45.

29. A golf ball comprising a core and a cover comprising an ionomeric resin in which the ionomeric resin contains at least 95 wt % of one or more terpolymers which are formed from ethylene, acrylic acid, and methyl acrylate, said cover having a Shore D hardness of about 40–64 and being based upon one or more unneutralized terpolymers with a mass average acid number of about 45 or less, the golf ball having a coefficient of restitution of at least 0.770 and a scuff resistance rating of no higher than 2.5.

30. A golf ball according to claim 29, wherein said one or more copolymers comprise a blend of at least two terpolymers.

31. A golf ball according to claim 29, wherein the cover contains at least 90 wt % ionomer resin.

32. A golf ball according to claim 29, wherein the ionomeric resin has a neutralization level of 50–100%.

33. A golf ball according to claim 29, wherein the cover has a Shore D hardness of about 52–54.

34. A golf ball according to claims 29, wherein the cover has a Shore D hardness of about 62–64.

35. A golf ball according to claim 29, wherein said one or more copolymers are based upon one or more unneutralized copolymers with a mass average acid number of about 45.

36. A golf ball according to claim 29, wherein the ball has a scuff resistance rating of no higher than 2.0.

37. A golf ball according to claim 29, wherein the ball has a scuff resistance rating of no higher than 1.5.

* * * * *